Figure 1:
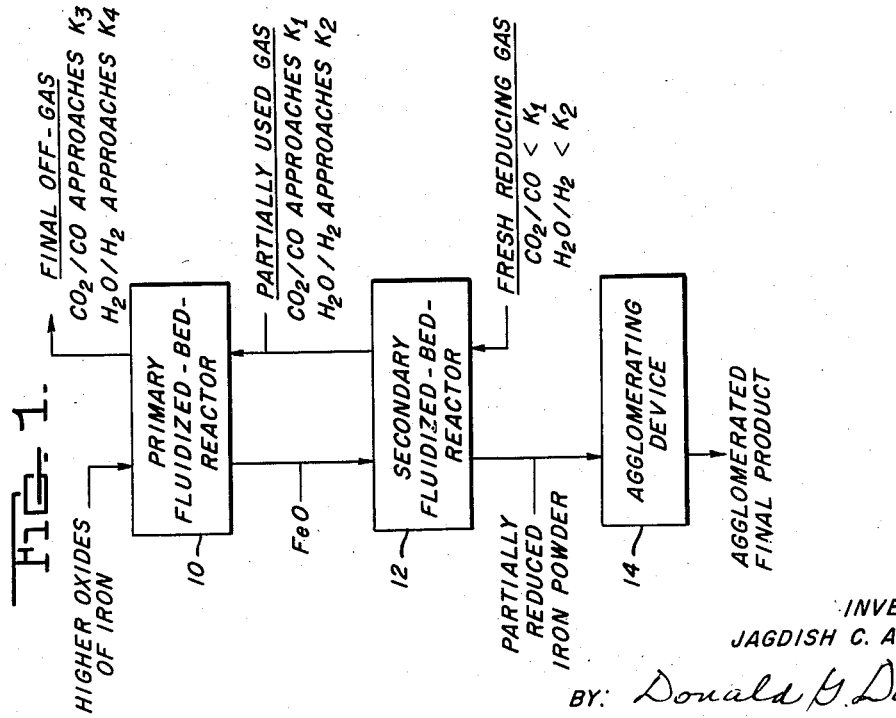

Dec. 16, 1958 J. C. AGARWAL 2,864,686
METHOD OF TREATING IRON OXIDE FINES
Filed Dec. 15, 1955 2 Sheets-Sheet 1

INVENTOR:
JAGDISH C. AGARWAL,
BY: Donald G. Dalton
his Attorney.

EQUILIBRIUM CONSTANTS FOR IRON OXIDE REDUCTION

$K_1 = CO_2/CO \quad FeO + CO \rightarrow Fe + CO_2$ $K_2 = H_2O/H \quad FeO + H_2 \rightarrow Fe + H_2O$ $K_3 = CO_2/CO \quad Fe_3O_4 + CO \rightarrow 3FeO + CO_2$ $K_4 = H_2O/H_2 \quad Fe_3O_4 + H_2 \rightarrow 3FeO + H_2O$ INVENTOR:
JAGDISH C. AGARWAL,
BY: Donald G. Dalton
his Attorney.

United States Patent Office 2,864,686
Patented Dec. 16, 1958

2,864,686

METHOD OF TREATING IRON OXIDE FINES

Jagdish C. Agarwal, Penn Township, Allegheny County, Pa., assignor to United States Steel Corporation, a corporation of New Jersey Application December 15, 1955, Serial No. 553,265

7 Claims. (Cl. 75—3)

This invention relates to a method of preparing iron oxide fines for use in steelmaking.

Although my invention is not limited to any particular steelmaking process, the product resulting from my method is especially suited as an ingredient of an open hearth charge. Nevertheless it is apparent the product also can be used advantageously in other processes, for example in an electric furnace. Conventionally an open hearth charge includes scrap, iron ore and molten pig iron ("hot metal") in varying proportions. The ore furnishes oxygen for oxidizing impurities from the scrap and hot metal, and of course contributes to the steel output. Commonly ore is introduced at two stages, to wit, "charge ore" with the initial charge and "feed ore" near the conclusion of each heat. The purpose of introducing feed ore is to adjust the final composition of the steel before it is tapped.

An object of the present invention is to provide a continuous direct reduction method of converting iron oxide fines to a synthetic product which replaces both scrap and ore in a steelmaking charge.

A more specific object is to provide a continuous direct reduction method of converting iron oxide fines to a product suitable as a component of a steelmaking charge in which the fines are partially reduced in two steps to leave iron and oxygen contents equivalent to the combined contents thereof in the scrap and ore replaced from a furnace charge, and the reduced fines are agglomerated without reoxidation.

A further object is to provide a two-step direct method of partially reducing iron oxide fines to a product suitable as a component of a steelmaking charge wherein reducing gases are utilized more efficiently than heretofore and in a smaller mole ratio, both as to oxide treated and as to product obtained.

Figure 2:
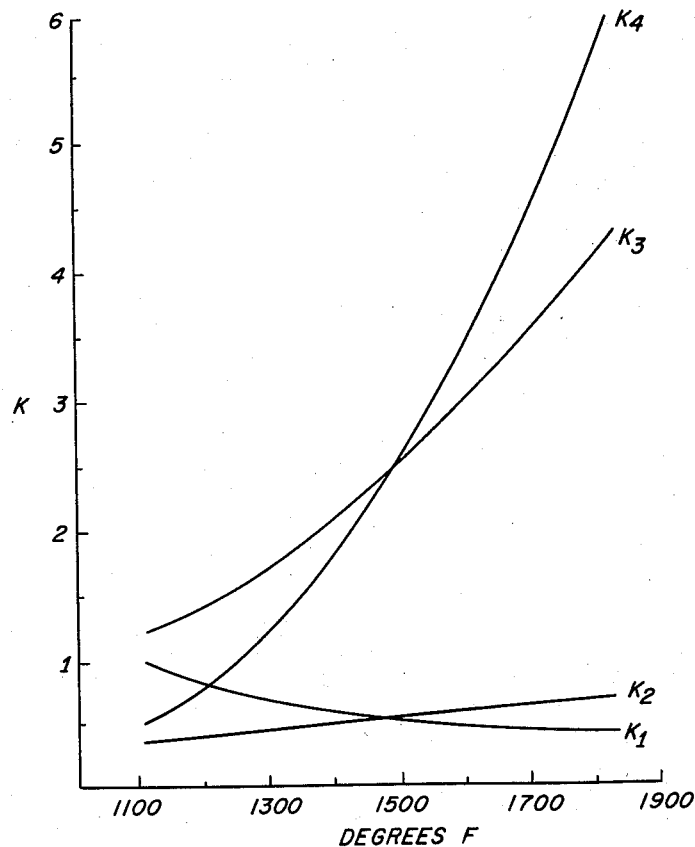

In the drawing:

Figure 1 is a schematic representation of a two-step direct partial reduction method in accordance with my invention; and Figure 2 is a graph showing the equilibrium constants at various temperatures of reactions involved in my method.

The starting material for my method can be any finely divided material which contains higher oxides of iron ($Fe_2O_3$ or $Fe_3O_4$). My method can utilize advantageously ore fines or taconite concentrates too fine for use in an open hearth or blast furnace without prior agglomeration. However, a suitable starting material also can be obtained by grinding coarse material to the proper fineness (minus ⅜ inch or finer). Although preferably the material is relatively free of impurities which are undesirable or must be eliminated in an open hearth, lower grade materials also can be used.

In the embodiment of my method shown schematically in Figure 1, I partially reduce the starting material in primary and secondary reactors 10 and 12, which per se can be of any conventional construction wherein ascending gas currents can maintain beds of finely divided solids in a fluidized state. The two reactors can be housed either in a common vessel appropriately partioned or in separate vessels. Finely divided iron oxide starting material is fed continuously to the primary reactor, where it is reduced to an intermediate product which consists substantially of FeO and contains only minor amounts of higher oxides or occasionally metallic iron. The entire output of intermediate product is fed continuously to the secondary reactor, where it is reduced by about another 55 to 90 percent, or preferably by about another 60 to 85 percent. If iron in the starting material is exclusively in the form of $Fe_2O_3$, reduction in the two steps removes about 70 to 94 percent of the oxygen originally present in the starting material or preferably about 75 to 90 percent. If $Fe_3O_4$ is present, the percentage reduction based on the starting material is of course correspondingly smaller. To effect partial rather than complete reduction in the second step, I supply a smaller mole ratio of reductant to iron oxide than would be needed for complete reduction. On a gangue-free basis the final product contains about 5 to 15 percent available oxygen, or preferably 7 to 12 percent, and the balance iron and incidental impurities.

Reducing gas for effecting these reduction steps flows continuously countercurrent to the flow of iron oxide; that is, fresh reducing gas is introduced continuously to the secondary reactor and off-gas from the secondary reactor is introduced continuously to the primary reactor. Preferably the reducing gas is hydrogen, carbon monoxide or a mixture thereof. With gas compositions which lead to endothermic reactions, the necessary heat can be supplied by any suitable conventional means, for example by preheating both the iron oxide and reducing gas. The final off-gas can be utilized in any way desired, although preferably it is regenerated and re-used in my reduction process.

The practical temperature range for both reactors is about 1100 to 1400° F., the preferred temperature being about 1300° F. In theory the lower temperature limit is governed by the lowest temperature which leaves sufficient reducing power in the off-gas from the secondary reactor to reduce the requisite quantity of higher oxides to FeO in the primary reactor according to the applicable equilibrium constant, as hereinafter explained. The upper temperature limit is governed by the maximum temperature that does not cause reduced particles to stick together and stop fluidization. The sticking temperature varies with process conditions, for example, type of ore, particle size, composition of the reducing gas. When the reducing gas is a typical mixture of CO and $H_2$, suitable reactor temperatures can be maintained by preheating the reducing gas to about 1500 to 1700° F. and the iron oxide starting material to about 1600 to 1800° F.

The partially reduced product from the secondary reactor 12 is introduced to an agglomerating device 14. This device can be any conventional device for agglomerating fines without reoxidation, for example a briquetting machine. The agglomerating operation can be performed with the product either hot or cold, and if necessary in an inert atmosphere. The agglomerates must possess sufficient mechanical strength to be handled in an open hearth without immediately breaking up. Ordinarily briquettes of sufficient strength and density can be formed from my partially reduced product by pressure alone without addition of any binder. Nevertheless a binder can be added if desired, as long it does not introduce undesirable impurities such as sulfur.

In the embodiment illustrated I maintain process conditions in the two reactors which substantially confine the reducing reactions in the primary reactor to:

$$Fe_2O_3 + CO \rightarrow 2FeO + CO_2$$
$$Fe_2O_3 + H_2 \rightarrow 2FeO + H_2O$$
$$Fe_3O_4 + CO \rightarrow 3FeO + CO_2$$
$$Fe_3O_4 + H_2 \rightarrow 3FeO + H_2O$$

In the secondary reactor the reducing reactions are:

$$FeO + CO \rightarrow Fe + CO_2$$
$$FeO + H_2 \rightarrow Fe + H_2O$$

As these reactions proceed, the reducing constituents of the gas are consumed while the oxidation products $CO_2$ and $H_2$ build up. In each instance the ratios $CO_2/CO$ and $H_2O/H_2$ can reach values sufficiently high that the reaction in effect ceases and the reacting substances are in equilibrium. In Figure 2 the curves K1 and K2 represent the maximum ratios of $CO_2/CO$ and $H_2O/H_2$ respectively which the reducing gas can contain and yet be capable of reducing FeO to metallic iron. Similarly the curves K3 and K4 represent the maximum ratios for reducing higher oxides to FeO. Within the practical temperature range hereinbefore discussed, K3 remains above K1, while K4 remains above K2; consequently off-gas from the secondary reactor retains sufficient reducing power to reduce higher oxides to FeO, but is ineffective to produce metallic iron. In the fresh reducing gas $CO_2$ and $H_2O$ are at a minimum, whereby the ratios $CO_2/CO$ and $H_2O/H_2$ are well below K1 and K2. In both reactors process conditions are controlled to maintain the reacting substances in contact long enough to approach equilibrium conditions, and in the off-gases the ratios are as close as possible to the respective curves.

A two-step complete reduction process affords better utilization of reducing gases than a single step process, since gases incapable of producing metallic iron from FeO are utilized effectively for producing FeO from higher oxides. My two-step partial reduction process affords even better utilization of reducing gases than a two-step complete reduction process. When reduction is complete, off-gas from the secondary reactor contains more reducing constituents than the reactions in the primary reactor can consume. Consequently the latter reactions cannot reach equilibrium; theoretically one mole of reducing gas can produce about 0.3 mole of metallic iron product. In my method the smaller mole ratio of reducing gas to product in the secondary reactor produces a smaller ratio of off-gas flowing to the primary reactor, and consumption of the reducing constituents in the primary reactor can be more nearly complete. Consequently the reactions in the primary reactor, as well as those in the secondary reactor, can approach equilibrium. One mole of reducing gas can produce up to about 0.5 mole of partially reduced product.

When my preferred two-step reduction method is followed, most of the available oxygen in the product is combined with iron as FeO and only minor amounts of higher oxides of iron can be present. In an open hearth higher oxides first must be reduced to FeO before they are effective for oxidizing impurities such as carbon from the charge, and the reducing reactions of these oxides to FeO are endothermic. My method accomplishes this reduction before the product reaches the open hearth and thus conserves heat therein. In reducing the higher oxides to FeO my method utilizes reducing potential which would otherwise be lost; hence it does more than merely transferring the locale of the reducing reaction from the open hearth to another reactor. In my product the oxygen has maximum dispersion throughout the metal. This dispersion improves the thermal conductivity of the product and enables heat to be transmitted through a charge faster and more efficiently than through conventional charges in which iron ore and scrap are introduced separately. Preferably the product is used promptly after its preparation to assure that the ferrous oxide does not decompose and that no reoxidation occurs.

As a specific example of my invention, a charge to an open hearth can include the following:

| | Pound metallic per net ton of ingot |
|---|---|
| Hot metal | 1200 |
| Scrap | 900 |
| Charge ore | [1] 150 |
| Feed ore | [2] 20 |
| Alloys | 30 |
| | 2300 |

[1] Gross weight 250 lbs. 60% iron.
[2] Gross weight 33.3 lbs. 60% iron.

If the charge ore contains 150 lbs. iron as $Fe_2O_3$, this ore supplies about 64 pounds of oxygen per net ton of ingot, and the charge ore and scrap together supply 1050 pounds of iron. If my synthetic product replaces the scrap and charge ore in toto, its composition would include iron and available oxygen in these same proportions. Ore fines used as a starting material for my synthetic product may have the following analysis:

| | Percent |
|---|---|
| Iron | 58.2 |
| Available oxygen | 24.9 |
| Gangue | 2.4 |
| Ignition loss | 14.5 |
| | 100.0 |

The weight of ore fines needed to furnish sufficient iron to replace the charge ore and scrap is about 1800 lbs. per net ingot ton. The weight of available oxygen in this weight of unreduced fines is about 450 lbs. The total percent reduction required to give the proper quantity of oxygen in my product is about 86 percent of that in the starting material or a further reduction of about 79 percent after reduction of the starting material to FeO. The composition of the synthetic product that would replace the scrap and charge ore in this instance is:

| | Pounds |
|---|---|
| Iron | 1050 |
| Available oxygen | 64 |
| Gangue | 43 |
| | 1157 |

On a gangue-free basis this product contains about 94 percent iron and 6 percent available oxygen in the form of FeO. If it is desired to replace only a portion of the scrap or charge ore or to replace some of the feed ore with my synthetic product, the weight of material required and the percent reduction can be determined in a similar manner.

The following table demonstrates the efficient utilization of reducing gas which my method attains. In this instance the method was the embodiment shown in Figure 1, the reducing gas hydrogen alone, the reaction temperature 1300 F., the starting material $Fe_2O_3$, and the reduction 75 percent based on the original oxygen content of the starting material.

| | |
|---|---|
| Starting gas volume | 1 mole $H_2$. |
| Feed | 0.24 mole $Fe_2O_3$. |
| Equilibrium composition at 1300 F. for FeO to Fe reaction | { 0.3 mole $H_2O$. <br> { 0.7 mole $H_2$. |
| Reducing gas available for production of Fe | 0.3 mole. |
| Maximum amount of metallic Fe produced | 0.3 mole. |
| FeO in product | 0.18 mole. |
| Total product | 0.48 mole. |
| Percent reduction based on starting material | 75%. |
| Off-gas from over-all reduction system | { 0.54 $H_2O$. <br> { 0.46 $H_2$. |

Equilibrium composition at 1300 F. for $Fe_3O_4$ and FeO ......... $\begin{cases} 0.54\ H_2O. \\ 0.46\ H_2. \end{cases}$
Percent equilibrium utilization of the reducing gas .................. 100%.

In like manner gas utilization can be determined for various mixtures of CO with hydrogen and for other percentages of reduction.

From the foregoing description it is seen that my invention affords both a simple method of replacing ore and scrap in steelmaking and a useful replacement product. The material utilized is one which must be agglomerated anyway before it can be charged to an open hearth or blast furnace. My invention overcomes dependence of steelmakers on the availability of scrap metal and special kinds of ore, and facilities control the size and quality of my product are uniform. Handling costs are less, since only one material is charged to the furnace in place of two or three.

While I have described only certain preferred ways of practicing my invention, it is apparent further modifications may arise. Therefore I do not wish to be limited by the disclosure, but only by the scope of the appended claims.

I claim:

1. A method of preparing a synthetic product for use in steelmaking comprising continuously reducing iron oxide fines substantially to FeO in a countercurrent fluidized bed, continuously partially reducing the FeO by about another 55 to 90 percent in countercurrent fluidized bed, and agglomerating the partially reduced fines without reoxidation.

2. A method of preparing a synthetic product for replacing scrap and ore in a steelmaking charge comprising continuously reducing iron oxide fines substantially to FeO in a countercurrent fluidized bed, continuously partially reducing the FeO in a countercurrent fluidized bed to leave iron and available oxygen contents equivalent to the combined contents thereof in the scrap and ore replaced from the charge, and agglomerating the partially reduced fines without reoxidation.

3. A method of treating iron oxide fines, which initially are of a particle size too fine to be charged to an open hearth, to form a synthetic product for replacing scrap and ore in an open hearth charge comprising continuously partially reducing the fines in a two-step system of fluidized beds to remove about 75 to 90 percent of the oxygen originally contained therein, the iron and available oxygen contents which remain being equivalent to the combined contents thereof in the scrap and ore replaced from the charge, and agglomerating the partially reduced fines without reoxidation.

4. A method as defined in claim 3 in which the iron oxide fines are first reduced substantially to FeO and thereafter all the resulting FeO is treated with reducing gases to effect a further reduction of about 60 to 85 percent.

5. A method of preparing a synthetic product for use in steelmaking comprising continuously introducing finely divided higher iron oxide starting material to a primary fluidized bed reactor, continuously introducing intermediate product from said primary reactor to a secondary fluidized bed reactor, continuously introducing ascending currents of a fresh reducing gas of the group consisting of carbon monoxide, hydrogen and mixtures thereof to said secondary reactor and of off-gas from said secondary reactor to said primary reactor counter to the flow of iron oxide material, the ascending gas currents maintaining the beds in each reactor in a fluidized state, maintaining both reactor temperatures in the range 1100 F. to the sticking temperature, controlling conditions in the secondary reactor to approach equilibrium for the reduction of FeO to Fe and in the primary reactor to approach equilibrium for the reduction of higher oxides of iron to FeO, whereby the intermediate product consists substantially of FeO and the ultimate product consists of metallic iron and FeO and has an available oxygen content on a gangue-free basis of about 5 to 15 percent by weight, and agglomerating the ultimate product without reoxidation.

6. A method as defined in claim 5 in which the entire intermediate product from the primary reactor is introduced to the secondary reactor and is partially reduced in the latter.

7. A method as defined in claim 5 in which each mole of reducing gas produces 0.3 to 0.5 mole of ultimate product.

References Cited in the file of this patent

UNITED STATES PATENTS

| | | |
|---|---|---|
| 962,006 | Cornell | June 21, 1910 |
| 1,979,729 | Brown | Nov. 6, 1934 |
| 2,287,663 | Brassert | June 23, 1942 |
| 2,481,217 | Hemminger | Sept. 6, 1949 |
| 2,528,552 | Royster | Nov. 7, 1950 |
| 2,711,368 | Lewis | June 21, 1955 |
| 2,752,234 | Shipley | June 26, 1956 |

FOREIGN PATENTS

| | | |
|---|---|---|
| 187,220 | Great Britain | Dec. 20, 1923 |